J. B. WILSON.
Ice Cutter.
No. 5,362.
Patented Nov. 6, 1847.
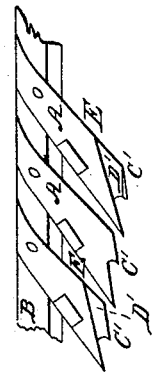
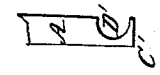
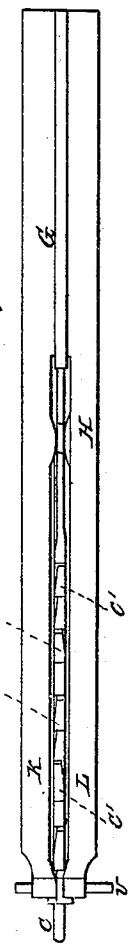
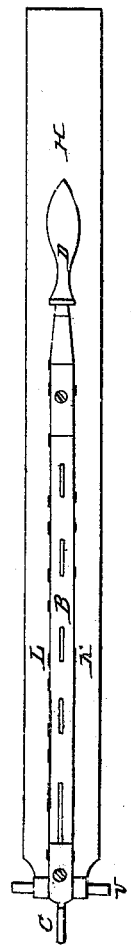
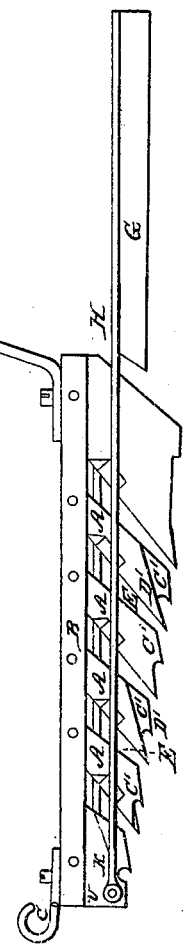

UNITED STATES PATENT OFFICE.

JOS. B. WILSON, OF MALDEN, MASSACHUSETTS.

ICE-CUTTER.

Specification of Letters Patent No. 5,362, dated November 6, 1847.

*To all whom it may concern:*

Be it known that I, JOSEPH B. WILSON, of Malden, in the county of Middlesex and State of Massachusetts, have invented a new and useful Improvement in Machinery for Grooving or Cutting Ice; and I do hereby declare that the same is fully described and represented in the following specification and accompanying drawings, letters, figures, and references thereof.

Of said drawings Figure 1 denotes a top view of my ice cutter, Fig. 2 is a side elevation of it, Fig. 3 is a bottom view of it, Fig. 4 is a side view of two adjacent teeth exhibiting the manner in which the supplementary teeth or cutters to be hereafter described are made, and applied to them.

In said drawings A, A &c. represent a series of chisels or cutters arranged in line with each other, and fastened to a suitable head or bar B, in the manner in which the cutters are usually arranged and screwed to the bar. The front end of said bar has a hook C, or other proper equivalent for attaching to the machine a horse or other animal power by which it is to be drawn over the ice. On the rear end of the bar is a guide handle D, to which an attendant or person when using the machine, applies his hands in order to steady it. The ordinary mode of shaping and arranging ice chisels and their shaving vents is seen in Fig. 5, in which *a*, *a*, *a*, denote the chisels and *b*, *b*, their vents. Each of said chisels *a*, *a*, *a*, consists of a strong piece of plate iron or steel having a cutting edge *c*, above which and between it, and the tooth or cutter in advance of it is a discharging space or vent *b* which is made to regularly increase in width as it ascends the said increase of width being for the purpose of allowing the chips or shavings of ice to readily clear themselves from the cutters. As the said cutters are to be of sufficient strength, they require to be made quite wide at their top parts, or where they are joined to the bar over them they must gradually increase in width from the said bar downward in order that each may be provided with a suitable discharging vent. It will thus be seen that the requisite size and shape of said cutters or their width at top, limits to a certain degree, the number which can be conveniently used upon a suitable length of bar.
My improved mode of making them enables me to provide each cutter or piece of metallic plate, with two cutting edges or chisels, and two vents—and at the same time preserve its proper width at top. To accomplish this I form in the rear of the cutting edges of each chisel, a supplementary chisel C′ and this I do by grooving out the side of the chisel plate as seen at D′, making of said groove a vent for said supplementary chisel which shall increase in width as it retreats and opens into the discharging vent E, of the next main chisel A. Fig. 6 denotes a vertical section of one of the chisel plates taken so as to exhibit the groove or vent of the supplementary cutter. By carrying said vent into the main discharging vent E, in rear of the cutter plate, I am able to make each of said cutter plates with two cutting edges, thereby making my machine capable of cutting into ice with much more ease than the common cutters do.

In order to cause the machine to cut a straight groove in the ice, I apply a vertical guide or rudder G in rear of it, which consists of a long and thin piece of metal made to project downward from a long plate H which is connected to the front end of the machine by two bars, L K arranged on opposite sides of the row of chisels as seen in Fig. 1. The said bars of the said guide are connected to the ice cutters by a pin U which is made to pass through their front ends, and the front part or chisel of the machine and so as to enable the rudder or guide to readily rise and fall, vertically. The plate G is of a thickness corresponding to that of the chisels, and when the machine is used it (the plate) is made to rest and move in the groove made by the chisels, and by so resting and moving in said groove it steers the machine in a straight direction. In making my improved ice cutter I propose to place the vent of the supplementary chisel, on that side of its plate, which is opposite to the side on which the one is made in the succeeding chisel plate.

What I claim as my invention is—

1. The supplementary chisel C′ and its discharging vent D′ as combined with or applied to each of the main chisels A and the discharging vent of the chisel in rear of it, the whole being substantially as specified.

2. I am aware that ice cutters have been made with guides hinged or so connected with them as to be caused to rest and move in a parallel groove to that which is to be cut, and therefore I do not claim a guide so combined with or arranged upon the ice cutter, but that which I do claim is the rudder or guide G as applied in the rear of the ice cutter and combined with it in manner as described and for the purpose of causing the ice cutter by the aid of the groove it is cutting to cut in a straight direction.

In testimony whereof I have hereto set my signature this nineteenth day of April, A. D. 1847.

JOSEPH B. WILSON.

Witnesses:
  R. H. EDDY,
  CALEB EDDY.